United States Patent
Ramesh et al.

(10) Patent No.: US 9,170,859 B2
(45) Date of Patent: Oct. 27, 2015

(54) TARGETED MEMORY PRESSURE EVENT NOTIFICATIONS

(71) Applicant: Apple Inc., Cupertino, CA (US)

(72) Inventors: Ananthakrishna Ramesh, Cupertino, CA (US); Daniel E. Crosby, Cupertino, CA (US); James Michael Magee, Orlando, FL (US); Lionel D. Desai, San Francisco, CA (US); Matthew G. Watson, San Francisco, CA (US); Neil G. Crane, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/650,083

(22) Filed: Oct. 11, 2012

(65) Prior Publication Data

US 2013/0332942 A1 Dec. 12, 2013

Related U.S. Application Data

(60) Provisional application No. 61/656,954, filed on Jun. 7, 2012.

(51) Int. Cl.
*G06F 9/54* (2006.01)
*G06F 9/50* (2006.01)

(52) U.S. Cl.
CPC .............. *G06F 9/542* (2013.01); *G06F 9/5016* (2013.01); *G06F 2209/504* (2013.01); *G06F 2209/508* (2013.01); *G06F 2209/543* (2013.01); *Y02B 60/142* (2013.01)

(58) Field of Classification Search
CPC .............. G06F 9/3009; G06F 2201/86; G06F 17/3051; G06F 9/542; G06F 9/5016; G06F 2209/508; G06F 2209/504; G06F 2209/543; Y02B 60/142

See application file for complete search history.

(56) References Cited

U.S. PATENT DOCUMENTS

| | | | |
|---|---|---|---|
| 6,477,561 B1 * | 11/2002 | Robsman | 718/105 |
| 8,095,930 B2 | 1/2012 | Chew | |
| 8,132,175 B2 | 3/2012 | Yoo | |
| 2006/0275934 A1 * | 12/2006 | Pohl et al. | 438/14 |
| 2006/0277373 A1 | 12/2006 | Pohl et al. | |
| 2008/0168235 A1 * | 7/2008 | Watson et al. | 711/135 |
| 2010/0205617 A1 * | 8/2010 | Hogan et al. | 719/328 |
| 2012/0179882 A1 * | 7/2012 | Bernhard et al. | 711/156 |
| 2012/0324481 A1 * | 12/2012 | Xia et al. | 719/320 |
| 2013/0326168 A1 * | 12/2013 | Chang et al. | 711/160 |

* cited by examiner

*Primary Examiner* — H S Sough
*Assistant Examiner* — Syed Roni
(74) *Attorney, Agent, or Firm* — Fish & Richardson P.C.

(57) ABSTRACT

Systems, methods, and computer program products for target memory pressure event notifications are disclosed. Processes running on a device can register to receive memory pressure event notifications from a memory management system, which are sent while memory pages are being reclaimed. Active processes running on a device processor can be assigned a priority that ranges from low to high. Responsive to a memory pressure event occurring on the device, the memory management system determines whether less than a threshold number of high priority processes are active on the device. If so, the memory management system sends a memory pressure event notification to the registered process with the lowest priority among the active processes.

30 Claims, 3 Drawing Sheets

TARGETED MEMORY PRESSURE EVENT NOTIFICATIONS

CROSS-REFERENCE TO RELATED APPLICATION

This application claims priority to U.S. Provisional Application Ser. No. 61/656,954, entitled "Targeted Memory Pressure Event Notifications," filed Jun. 7, 2012, the entire contents of which are incorporated herein by reference.

TECHNICAL FIELD

This disclosure is related generally to memory management.

BACKGROUND

Many data processing devices (e.g., mobile phone, electronic tables) are equipped with a limited amount of Random Access Memory (RAM), which fills as a user of the device launches applications. When an application is launched, one or more processes are started. A process is an instance of a software program that is sequentially executed by one or more processors of the device. A process can run concurrently with other processes on the device.

A memory management system dynamically allocates portions of memory to processes at their request and frees memory for reuse when no longer needed. For example, a virtual memory management system on a device can separate memory addresses used by a process from actual physical memory addresses, allowing separation of processes to effectively increase the available amount of RAM using paging or swapping to secondary storage.

When faced with a low memory condition, some memory management systems record a priority level for each process executing on the device and automatically terminate the lowest priority processes to free up memory without user intervention. The priority level is recorded prior to the low memory condition, when the process starts. Low priority processes are less likely to be used by user applications, and so their memory can be reclaimed for use by other, higher priority processes. The lowest priority processes are generally the least recently launched applications. The highest priority processes are generally the most recently launched applications and critical system processes.

As higher priority processes make use of more memory, processes are terminated in sequence gradually according to a priority scheme. If this termination process continues, user applications may be terminated. Terminating a user application affects the user's experience with a device due to the delay incurred in re-launching the terminated user application. One solution to this problem is to notify high priority processes ahead of their termination that the memory management system is facing memory pressure, so that the processes can release memory containing non-essential data. This can potentially free memory and let running processes co-exist without any further action. A crucial part of this procedure, however, is to identify when the memory management system is really under memory pressure. Since memory may be "full" with many low priority processes that are infrequently run, those low priority processes can be terminated without significant impact on the user experience. On the other hand, asking higher priority applications to free memory can have a negative performance affect, especially for multi-tasking environments where a user may be running two or more applications concurrently.

SUMMARY

Systems, methods, and computer program products for target memory pressure event notifications are disclosed. Processes running on a device can register to receive memory pressure event notifications from a memory management system, which can be sent while memory pages are being reclaimed. Active processes running on a device processor can be assigned a priority that ranges from low to high. For example, a foreground process can have a higher priority than a background process. Responsive to a memory pressure event occurring on the device exceeding a threshold level, the memory management system determines whether less than a threshold number of high priority processes are active on the device. If so, the memory management system sends a memory pressure event notification to the registered process with the lowest priority among the active processes.

Upon receipt of the memory pressure event notification, the process (e.g., user application) can take various actions to prepare for termination, such as storing data to disk. If the memory pressure event persists after the memory pressure event notification, memory can be reclaimed from the process. These notification/memory reclamation processes continue for each process in a process priority list until the memory pressure event is resolved.

In some implementations, a method of managing memory comprises: assigning priorities to processes running on a device; responsive to a memory pressure event on the device exceeding a threshold level, determining that less than a threshold number of high priority processes are active on the device; and responsive to the determining, sending a memory pressure event notification to the active process with the lowest priority.

Particular implementations of targeted memory pressure event notification as disclosed herein provide one or more of the following advantages. Targeted memory pressure event notification ensures that low priority processes are targeted for termination before high priority processes to free memory, thus improving overall device performance.

The details of the disclosed implementations are set forth in the accompanying drawings and the description below. Other features, objects, and advantages will be apparent from the description and drawings, and from the claims.

DESCRIPTION OF DRAWINGS

The same reference symbol used in various drawings indicates like elements.

DETAILED DESCRIPTION

Exemplary Memory Management System

Figure 1A:
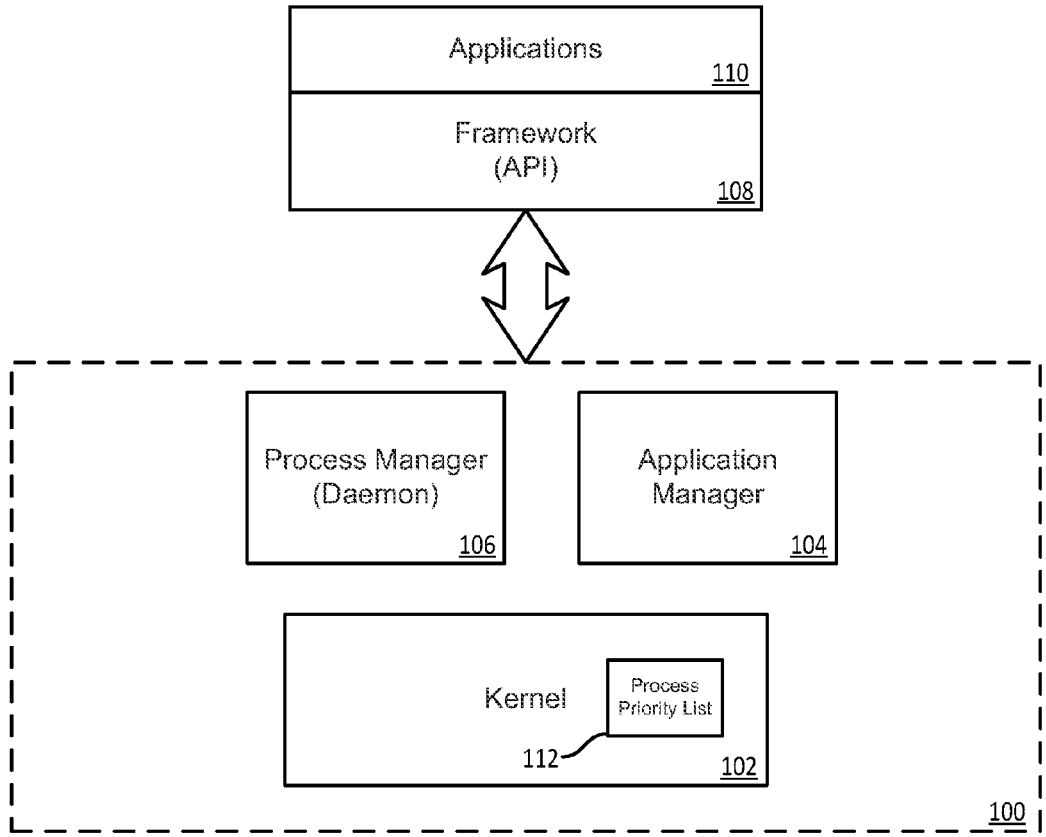
FIG. 1A is a block diagram of an exemplary memory management system with targeted memory pressure event notification.

FIG. 1A is a conceptual block diagram of an exemplary memory management system 100 with targeted memory pressure event notification. In the example shown, memory management system 100 can include various components, including kernel 102, application manager 104, process manager 106 and process priority list 112. Each of these components can be implemented in program code that can be executed by one or more processors of a device to perform various tasks related to memory management, including but not limited memory page reclamation. In some implementations, process priority list 112 can be in kernel 102.

The components can be located at various locations of a "software stack" of the device. The components can communicate with each other using inter-process communication and system calls. Any data processing device can include memory management system 100, including but not limited to notebook computers, smart phones, game consoles, media players and electronic tablet computers.

Kernel 102 can be part of a computer operating system and manages system resources, such as the communication between hardware and software components. For example, kernel 102 can manage a device's resources and allow other programs to run and use these resources, which can include managing one or more Central Processing Units (CPUs) or processing cores to run or execute programs. Kernel 102 can also manage a computer's memory to decide, which memory a given process can use and determining what to do when not enough memory is available. In some implementations, kernel 102 provides a page scanning process that searches for unused pages of memory (e.g., RAM) that can be reclaimed for other processes.

Application manager 104 is responsible for managing applications 110. For example, application manager 104 can place an application process in background or foreground. An example of an application manager is "Springboard," which is an application that manages the "home screen" of portable Apple hardware devices that run Apple Inc.'s iPhone OS (iOS).

Process manager 106 can be a daemon process that runs in the background and manages all of the processes running on a device. In some implementations, process manager 106 is responsible for launching and terminating applications on the device.

Framework 108 is a software framework that is an abstraction in which software providing generic functionality can be selectively changed by user code to provide application-specific software. Framework 108 can include software libraries providing a defined Application Programming Interface (API). A developer of an application 110 can use the API to provide instructions that can be processed by the various components of system 100. For example, a developer can use the API to register an application to receive memory pressure event notifications. A memory pressure event occurs, for example, when the percentage of free memory available to applications 110 and other system resources falls below a threshold level causing a memory page reclaim process to begin.

In some implementations, processes associated with applications 110 register with kernel 102 through an API of framework 108 to receive memory pressure event notifications. A memory pressure event notification can include data that is sent to an application to warn the application that it may be terminated so that the memory it is using can be reclaimed for other processes. This notification allows the application to perform various tasks defined by the application developer prior to termination, such as caching essential data to hard disk or other storage device. The notification can be a simple binary value to indicate imminent termination or can be a code including two or more bits to indicate additional information regarding termination, such as a severity level of the notification.

Figure 1B:
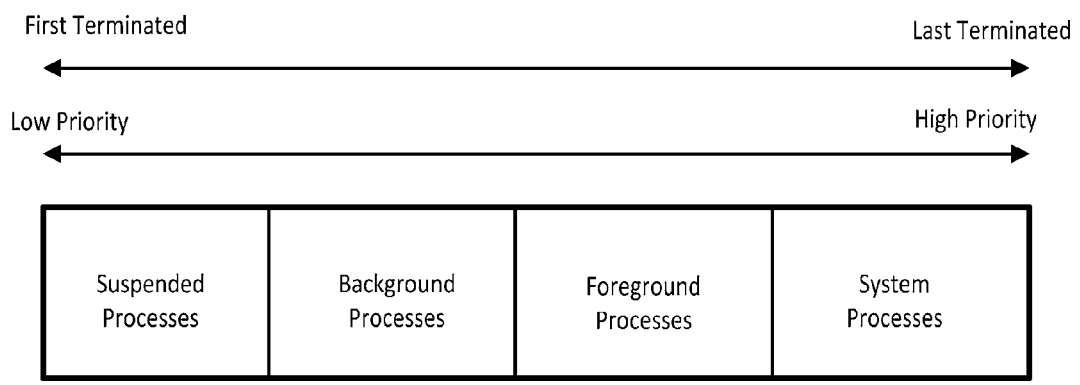
FIG. 1B illustrates a process priority list as described in reference to FIG. 1A.

FIG. 1B illustrates process priority list 112 as described in reference to FIG. 1A. Processes that registered with a device operating system/memory management system are placed in process priority list 112 according to priority of importance. The priority can be determined by the operating system or by the application.

Some examples of processes that range from low priority to high priority include but are not limited to suspended processes, background processes, foreground processes and system processes, where suspended processes are the lowest priority processes and system processes are the highest priority processes. Generally, it is desirable to terminate low priority processes before high priority processes. In this example, a process termination order for a memory reclamation process can be suspended processes, background processes, foreground processes and system processes.

Exemplary Memory Pressure Event Notification Process

Figure 2:
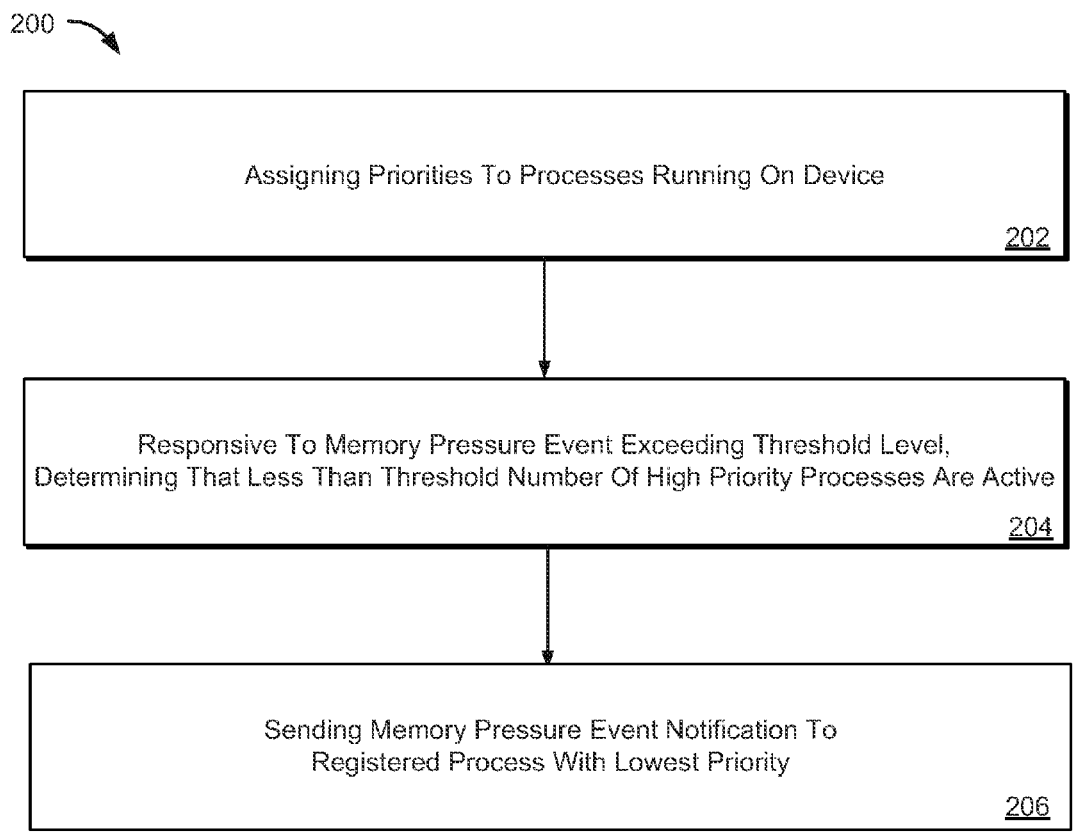
FIG. 2 is a flow diagram of exemplary process for targeted memory pressure event notification.

FIG. 2 is a flow diagram of exemplary process 200 for targeted memory pressure event notification. Process 200 can be implemented using the memory management system 100, as described in reference to FIG. 1.

In some implementations, process 200 can begin by assigning priorities to processes running on a device (202). When an application is installed on a device, the application can register with the operating system for memory pressure event notifications. When the application is launched, processes associated with the registered application are placed in a process priority list based on the assigned priorities. The assigned priorities determine an order of termination during a memory reclamation process. Generally, lower priority processes are terminated before higher priority processes to free up memory for the higher priority applications, as described in reference to FIG. 1B.

Responsive to a memory pressure event exceeding a threshold level, a virtual memory management system (e.g., memory management system 100) running on the device determines that less than a threshold number of high priority processes are active on the device (204). An example threshold level can be a percentage of free memory available to applications (e.g., less than 20% of free memory available to applications). Available memory can be comprised of entirely free memory (e.g., totally unused memory) plus used-but-clean memory (e.g., memory currently in use, but contains data that can be discarded and reloaded later, such as program code). An example of memory that is not available for use is "dirty" memory (e.g., memory written to or modified) or wired (e.g., memory that is locked down and reserved).

If less than a threshold number of high priority processes are active, the virtual memory management system sends a memory pressure event notification to the registered process with the lowest priority among the active, high priority processes running on the device (206). After the process receives the notification, the memory management system marks the process as notified.

If the memory pressure event persists after notification, memory can be reclaimed from the process. Memory may or may not be reclaimed, according to the state of the process and how the memory pressure event is handled by the process. These notification/memory reclamation processes continue for each process in the process priority list until the memory pressure event is resolved. When the memory pressure event is resolved (e.g., due to the freeing of memory from terminated processes) the process priority list is reset and all clear notifications are sent to the active processes.

In some implementations, the memory pressure event notification can be a code that indicates a severity level of the memory pressure event. For example, a memory pressure event can have three severity levels with level one being less severe than level three. A level-three severity level can mean that termination is imminent. The process receiving the memory pressure event notification can use the severity level to prepare for the termination. For example, there can be different amounts of time before termination based on severity level, allowing the process to perform appropriate pre-termination tasks.

To summarize process 200, when the memory management system determines that it is necessary to terminate a process to reclaim memory, the process with the lowest priority is terminated. There is a memory pressure event notification when this happens; execution is stopped and the process is terminated.

When the memory management system determines that less than the threshold number of high priority processes are active, the remaining processes are targeted in order from lowest priority to highest priority to receive a memory pressure event notification. A notified process can react to the notification and release memory by dumping caches, etc. The termination (memory reclamation) process and notification process described above can work independently. For example, if a memory pressure event notification is being handled by the lowest priority process, but the free and available memory in the memory system drops precipitously, the lowest priority process can be terminated without further notification.

Exemplary Device Architecture

Figure 3:
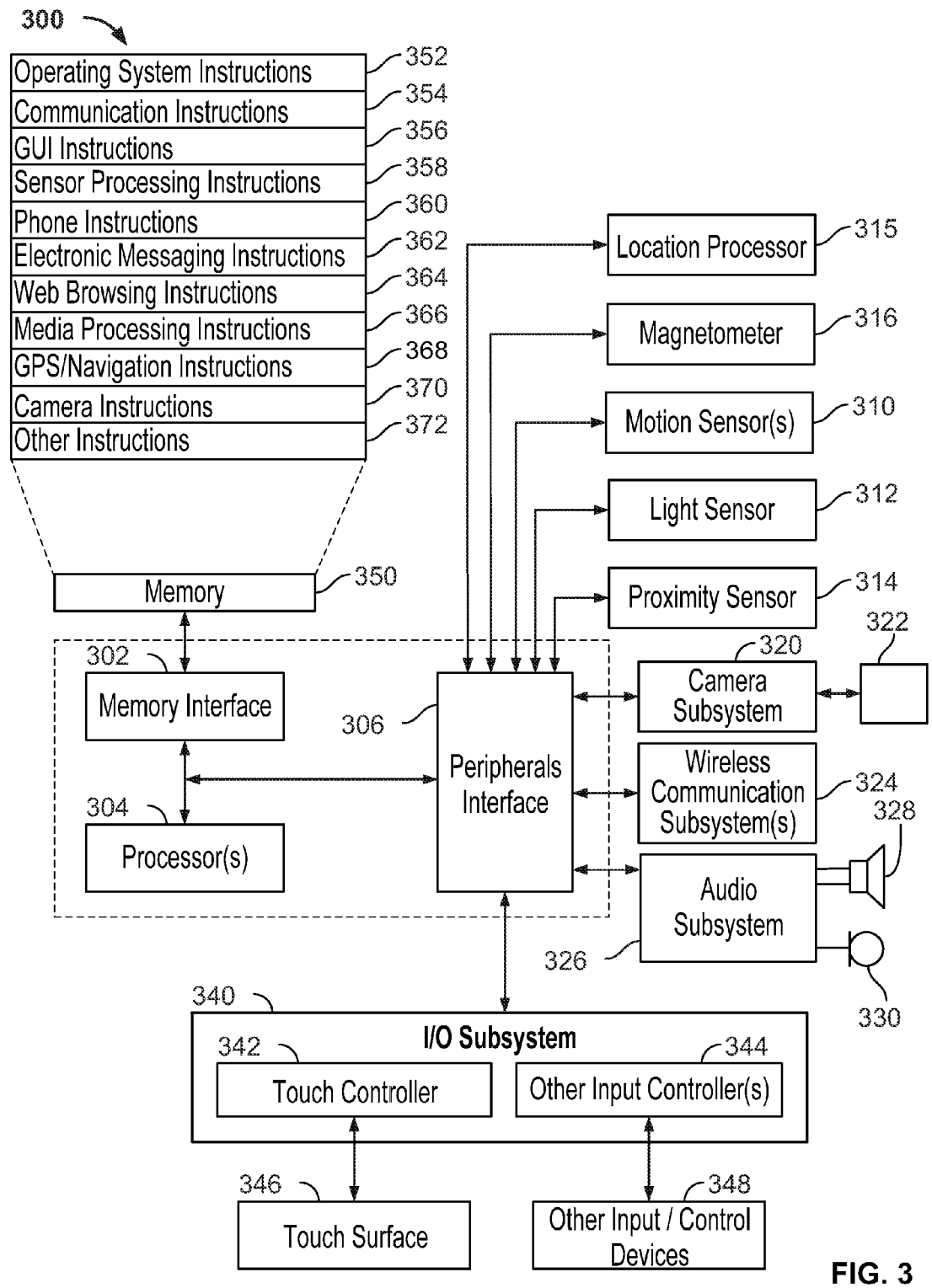
FIG. 3 is a block diagram of an exemplary architecture of a device capable of implementing memory management with targeted memory pressure event notification.

FIG. 3 is a block diagram of an exemplary architecture of a device capable of implementing memory management with targeted memory notification. Architecture 300 can be implemented in any device, including but not limited to portable or desktop computers, smart phones and electronic tablets, television systems, game consoles, kiosks and the like. Architecture 300 can include memory interface 302, data processor(s), image processor(s) or central processing unit(s) 304, and peripherals interface 306. Memory interface 302, processor(s) 304 or peripherals interface 306 can be separate components or can be integrated in one or more integrated circuits. The various components can be coupled by one or more communication buses or signal lines.

Sensors, devices, and subsystems can be coupled to peripherals interface 306 to facilitate multiple functionalities. For example, motion sensor 310, light sensor 312, and proximity sensor 314 can be coupled to peripherals interface 306 to facilitate orientation, lighting, and proximity functions of the device. For example, in some implementations, light sensor 312 can be utilized to facilitate adjusting the brightness of touch surface 346. In some implementations, motion sensor 310 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 306, such as a temperature sensor, a biometric sensor, or other sensing device, to facilitate related functionalities.

Location processor 315 (e.g., GPS receiver) can be connected to peripherals interface 306 to provide geo-positioning. Electronic magnetometer 316 (e.g., an integrated circuit chip) can also be connected to peripherals interface 306 to provide data that can be used to determine the direction of magnetic North. Thus, electronic magnetometer 316 can be used as an electronic compass.

Camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 324. Communication subsystem(s) 324 can include one or more wireless communication subsystems. Wireless communication subsystems 324 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 324 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 324 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 326 can be coupled to a speaker 328 and one or more microphones 330 to facilitate voice-enabled functions, such as voice recognition, voice replication, digital recording, and telephony functions.

I/O subsystem 340 can include touch controller 342 and/or other input controller(s) 344. Touch controller 342 can be coupled to a touch surface 346. Touch surface 346 and touch controller 342 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 346. In one implementation, touch surface 346 can display virtual or soft buttons and a virtual keyboard, which can be used as an input/output device by the user.

Other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of speaker 328 and/or microphone 330.

In some implementations, device 300 can present recorded audio and/or video files, such as MP3, AAC, and MPEG files. In some implementations, device 300 can include the functionality of an MP3 player and may include a pin connector for tethering to other devices. Other input/output and control devices can be used.

Memory interface 302 can be coupled to memory 350. Memory 350 can include high-speed random access memory or non-volatile memory, such as one or more magnetic disk storage devices, one or more optical storage devices, or flash memory (e.g., NAND, NOR). Memory 350 can store operating system 352, such as Darwin, RTXC, LINUX, UNIX, OS X, WINDOWS, or an embedded operating system such as VxWorks. Operating system 352 may include instructions for handling basic system services and for performing hardware dependent tasks. In some implementations, operating system 352 can include a kernel (e.g., UNIX kernel). Operating system 352 can include a memory management system for providing targeted memory pressure event notifications, as described in reference to FIGS. 1 and 2.

Memory 350 may also store communication instructions 354 to facilitate communicating with one or more additional devices, one or more computers or servers. Communication instructions 354 can also be used to select an operational mode or communication medium for use by the device, based on a geographic location (obtained by the GPS/Navigation instructions 368) of the device. Memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions as described in reference to FIGS. 1-8; web browsing instructions 364 to facilitate web browsing-related processes and functions; media processing instructions 366 to facilitate media processing-related processes and functions; GPS/Navigation instructions 368 to facilitate GPS and navigation-related processes; camera instructions 370 to facilitate camera-related processes and functions; and other instructions 372. The memory 350 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 350 can include additional instructions or fewer instructions. Furthermore, various functions of the mobile device may be implemented in hardware and/or in software, including in one or more signal processing and/or application specific integrated circuits.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of managing memory, comprising:
   assigning priorities to processes running on a device;
   responsive to a memory pressure event on the device exceeding a threshold level, determining that less than a threshold number of high priority processes are active on the device; and
   responsive to determining that less than the threshold number of high priority processes are active on the device, sending a memory pressure event notification to an active process with the lowest priority, wherein the memory pressure event notification initiates a memory reclamation event,
   where the method is performed by one or more hardware processors.

2. The method of claim 1, wherein the threshold level is a percentage of free memory available to applications.

3. The method of claim 1, further comprising:
   registering a process with an operating system or memory management system of the device for receiving memory pressure event notifications.

4. The method of claim 3, where the registration is through an Application Programming Interface (API) of a software framework.

5. The method of claim 3, where the memory pressure event notification includes a code representing a severity level.

6. The method of claim 1, wherein the memory reclamation event comprises terminating the active process with the lowest priority.

7. The method of claim 1, wherein the memory reclamation event comprises dumping contents of a cache memory.

8. The method of claim 1, wherein memory reclamation event comprises:
   dumping contents of a cache memory; and
   subsequent to dumping contents of the cache memory, terminating the active process with the lowest priority.

9. The method of claim 8, wherein the active process with the lowest priority is terminated an interval of time after the contents of the cache memory is dumped.

10. The method of claim 9, wherein the interval of time is determined based of a severity level of the memory pressure event.

11. A system of managing memory, comprising:
    one or more processors;
    memory coupled to the one or more processors and having instructions, which, when executed by the one or more processors, causes the one or more processors to perform operations comprising:
    assigning priorities to processes running on a device;
    responsive to a memory pressure event on the device exceeding a threshold level, determining that less than a threshold number of high priority processes are active on the device; and
    responsive to the determining, sending a memory pressure event notification to an active process with the lowest priority, wherein the memory pressure event notification initiates a memory reclamation event.

12. The system of claim 11, wherein the threshold level is a percentage of free memory available to applications.

13. The system of claim 11, where the operations further include:
    registering a process with an operating system or memory management system of the device for receiving memory pressure event notifications.

14. The system of claim 13, where the registration is through an Application Programming Interface (API) of a software framework.

15. The system of claim 13, where the memory pressure event notification includes a code representing a severity level.

16. The system of claim 11, wherein the memory reclamation event comprises terminating the active process with the lowest priority.

17. The system of claim 11, wherein the memory reclamation event comprises dumping contents of a cache memory.

18. The system of claim 11, wherein memory reclamation event comprises:
    dumping contents of a cache memory; and
    subsequent to dumping contents of the cache memory, terminating the active process with the lowest priority.

19. The system of claim 18, wherein the active process with the lowest priority is terminated an interval of time after the contents of the cache memory is dumped.

20. The system of claim 19, wherein the interval of time is determined based of a severity level of the memory pressure event.

21. A non-transitory computer-readable medium including one or more sequences of instructions which, when executed by one or more processes, causes:
    assigning priorities to processes running on a device;
    responsive to a memory pressure event on the device exceeding a threshold level, determining that less than a threshold number of high priority processes are active on the device; and
    responsive to the determining, sending a memory pressure event notification to an active process with the lowest priority, wherein the memory pressure event notification initiates a memory reclamation event.

22. The non-transitory computer-readable medium of claim 21, wherein the threshold level is a percentage of free memory available to applications.

23. The non-transitory computer-readable medium of claim 21, where the operations further include:
    registering a process with an operating system or memory management system of the device for receiving memory pressure event notifications.

24. The non-transitory computer-readable medium of claim 23, where the registration is through an Application Programming Interface (API) of a software framework.

25. The non-transitory computer-readable medium of claim 23, where the memory pressure event notification includes a code representing a severity level.

26. The non-transitory computer-readable medium of claim 21, wherein the memory reclamation event comprises terminating the active process with the lowest priority.

27. The non-transitory computer-readable medium of claim 21, wherein the memory reclamation event comprises dumping contents of a cache memory.

28. The non-transitory computer-readable medium of claim 21, wherein memory reclamation event comprises:
   dumping contents of a cache memory; and
   subsequent to dumping contents of the cache memory, terminating the active process with the lowest priority.

29. The non-transitory computer-readable medium of claim 28, wherein the active process with the lowest priority is terminated an interval of time after the contents of the cache memory is dumped.

30. The non-transitory computer-readable medium of claim 29, wherein the interval of time is determined based of a severity level of the memory pressure event.

* * * * *